US009528862B2

(12) United States Patent
Lawson, III et al.

(10) Patent No.: US 9,528,862 B2
(45) Date of Patent: Dec. 27, 2016

(54) FLAME RESISTANT FABRIC WITH TRACING YARNS

(71) Applicant: PBI Performance Products, Inc., Charlotte, NC (US)

(72) Inventors: William L. Lawson, III, Charlotte, NC (US); Kimberly M. Henry, Charlotte, NC (US); Brian P. Shiels, Charlotte, NC (US)

(73) Assignee: PBI Performance Products, Inc., Charlotte, NC (US)

(*) Notice: Subject to any disclaimer, the term of this patent is extended or adjusted under 35 U.S.C. 154(b) by 121 days.

(21) Appl. No.: 14/305,090

(22) Filed: Jun. 16, 2014

(65) Prior Publication Data

US 2014/0290560 A1 Oct. 2, 2014

Related U.S. Application Data

(62) Division of application No. 13/333,217, filed on Dec. 21, 2011, now abandoned.

(60) Provisional application No. 61/429,915, filed on Jan. 5, 2011.

(51) Int. Cl.
| | |
|---|---|
| *D03D 15/00* | (2006.01) |
| *D03D 25/00* | (2006.01) |
| *G01L 5/04* | (2006.01) |
| *G01D 7/00* | (2006.01) |
| *D03D 15/12* | (2006.01) |
| *D04H 3/005* | (2012.01) |
| *D04H 1/4382* | (2012.01) |

(52) U.S. Cl.
CPC .......... *G01D 7/005* (2013.01); *D03D 15/0033* (2013.01); *D03D 15/12* (2013.01); *D04H 1/4382* (2013.01); *D04H 3/005* (2013.01); *D10B 2501/04* (2013.01); *Y10T 428/249921* (2015.04); *Y10T 442/3984* (2015.04); *Y10T 442/40* (2015.04); *Y10T 442/60* (2015.04)

(58) Field of Classification Search
None
See application file for complete search history.

(56) References Cited

U.S. PATENT DOCUMENTS

| | | | |
|---|---|---|---|
| 4,681,791 | A | 7/1987 | Shibahashi et al. |
| 4,710,200 | A | 12/1987 | Cates et al. |
| 5,207,803 | A | 5/1993 | Holsten et al. |
| 5,221,288 | A | 6/1993 | Kamata et al. |
| 5,482,763 | A | 1/1996 | Shaffer |
| 5,635,909 | A | 6/1997 | Cole |
| 5,802,882 | A | 9/1998 | Girard et al. |
| 6,209,144 | B1 | 4/2001 | Carter |
| 6,444,313 | B1 * | 9/2002 | Ono ........................ D01F 1/04 |
| | | | 106/448 |

(Continued)

*Primary Examiner* — Peter Macchiarolo
*Assistant Examiner* — Jermaine Jenkins
(74) *Attorney, Agent, or Firm* — Hammer & Associates, P.C.

(57) ABSTRACT

A flame resistant fabric with tracing yarns includes a flame resistant fabric with a first non-tracing yarn, and a second tracing yarn. The first non-tracing yarn and/or the second tracing yarn include flame resistant fibers being selected from the group consisting of inherently flame resistant fibers and treated fibers. When the flame resistant fabric is exposed to heat, flames, long-term excessive UV light, or the like, the first non-tracing yarn is adapted to hold its color and the second tracing yarn is adapted to change colors.

16 Claims, 3 Drawing Sheets

(56) References Cited

U.S. PATENT DOCUMENTS

| | | |
|---|---|---|
| 6,451,070 B1 | 9/2002 | Kent et al. |
| 6,786,243 B2 * | 9/2004 | Moriarty ................ D02G 3/447 139/420 R |
| 6,867,154 B1 | 3/2005 | Lunsford et al. |
| 7,589,036 B2 | 9/2009 | Corner et al. |
| 7,862,045 B2 | 1/2011 | Hodge |
| 8,029,190 B2 | 10/2011 | MacDonald et al. |
| 2001/0009832 A1 | 7/2001 | Shaffer et al. |
| 2003/0224155 A1 * | 12/2003 | Orth ....................... D03D 15/00 428/223 |
| 2004/0198125 A1 | 10/2004 | Mater et al. |
| 2004/0237164 A1 | 12/2004 | Aperfine et al. |
| 2008/0023379 A1 | 1/2008 | O'Connor |
| 2009/0049579 A1 | 2/2009 | Roberts |
| 2009/0111345 A1 * | 4/2009 | Panse ................ A41D 31/0027 442/138 |
| 2010/0151756 A1 | 6/2010 | Kim |

* cited by examiner

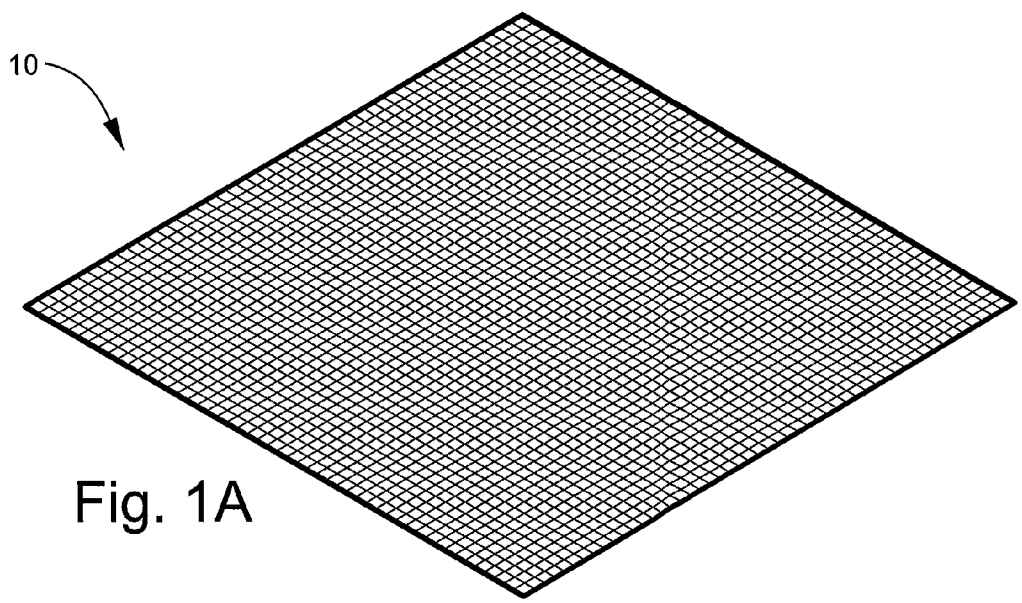
Fig. 1A
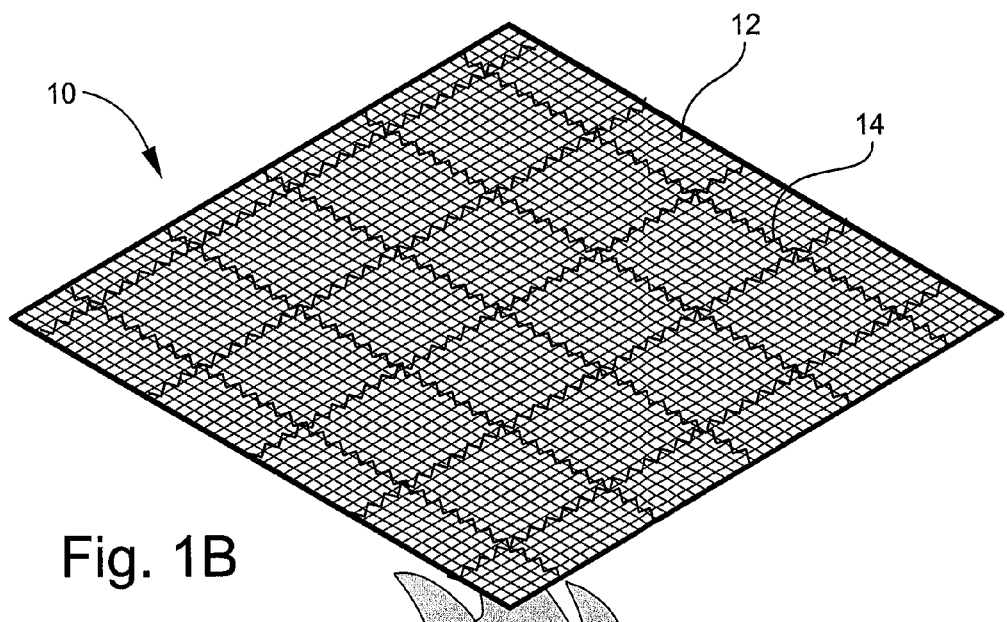
Fig. 1B
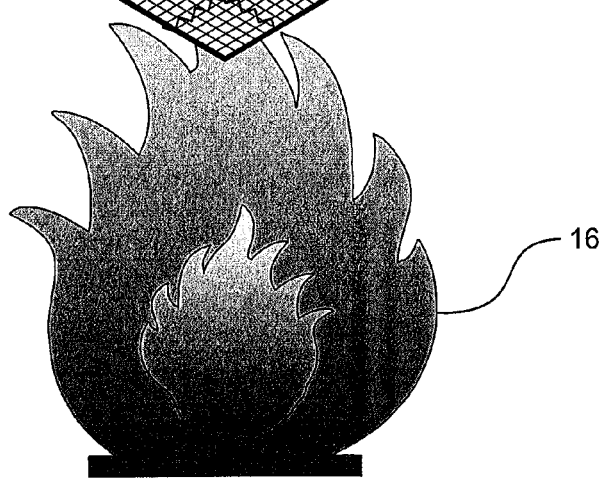

FLAME RESISTANT FABRIC WITH TRACING YARNS

RELATED APPLICATIONS

This divisional application claims the benefit of co-pending application Ser. No. 13/333,217 filed Dec. 21, 2011, now abandoned, which claimed the benefit of provisional application Ser. No. 61/429,915 filed Jan. 5, 2011.

FIELD OF THE INVENTION

The instant invention is directed toward a flame resistant fabric, namely, a flame resistant fabric with tracing yarns for notifying a user when a garment and its components needs to be examined and/or replaced due to high heat exposure, flame exposure, long-term overexposure to ultraviolet (UV) light, or the like.

BACKGROUND OF THE INVENTION

Flame resistant fabrics are those fabrics made from flame resistant fibers, also known as FR fibers, and blends of flame resistant fibers. Some flame resistant fabrics may also include a minority of non-FR fibers that are blended with flame resistant fibers. Flame resistant fibers, or FR fibers, are those fibers that have flame resistance as an essential characteristic of the fiber. Flame resistant fibers could be inherently flame resistant fibers or fibers treated to become flame resistant. Typically, a treated fiber is a conventional textile fiber that has been treated with a flame retardant, or a chemical substance used to impart flame resistance. Not only can the fiber be treated with a flame retardant, but the resulting fabric can also be treated with a flame retardant to make the fabric flame resistant. For example, treated fibers or fabrics include: FR cotton, FR-treated rayon (both FR cellulosics), and the like. Inherently flame resistant fibers may include: aramids, polyamide imides, melamines, polybenzimidazole (PBI), polyimides, polyphenylene benzodisoxazole (PBO), polyphenylene sulfide (PPS), carbon, Polytetrafluoroethylene (PTFE), polyetherether ketone (PEEK), modacrylic, inherently-FR rayon, liquid crystal polymers, and the like.

Most often these flame resistant fibers (treated and/or inherent) are blended together to obtain a yarn for a fabric with a particular blend of preferred properties. The preferred properties include thermal protection, static resistance, comfort, durability, stability, appearance, moisture management, abrasion resistance, anti-bacterial, ease of laundry maintenance, color, relative cost, etc., and combinations thereof. As a result, flame resistant fabrics can be used for many different purposes and in many different industries. These include, but are not limited to, the fire service industry, military, law enforcement, wildland fires, urban search and rescue incidents, in foundries, at electrical utilities, in the chemical, oil, gas, and petrochemical industries, in auto racing, areas of rioting, and illicit drug manufacturing labs, just to mention a few. One specific example of a use for a flame resistant fabric is the outer shell fabric of a firefighter's personal protective garment used in structural fires, also known as the outer shell fabric for fireman's turnout gear.

With such a broad range of application, it should be understood that there exists a need for flame resistant fabrics in many different colors and shades of colors. Typically, flame resistant fibers and fabrics are provided in various colors and shades by dyeing the fabric or yarn, also known as piece-dyeing or yarn-dyeing. For example, a process of piece-dyeing or yarn-dyeing a PBI fiber to a black color is to add a dye to the fabric after it is produced or to add a dye to the yarn after it is produced. One problem with traditional piece-dyed or yarn-dyed flame resistant fabrics is sublimation of the dyes from the fabric due to high heat exposure, flame exposure, and fading due to long-term excessive UV exposure, or the like. For example, a traditionally yarn-dyed black PBI/para-aramid flame resistant fabric when exposed to significant heat may cause the fabric to change to a reddish brown color in the area of heat exposure. As another example, a traditionally piece-dyed black PBI/para-aramid flame resistant fabric when exposed to significant heat exposure can cause the fabric to change to a similar reddish brown color in the area of the heat exposure. This overall color change of the fabric is clearly not desirable.

Another way to produce a colored flame resistant fabric is to utilize solution-dyed fibers. Solution-dyeing, also known as dope-dyeing or producer-dyeing, is a process where a colorant is added to the chemical compound before extrusion of the fiber. There are numerous known means of producing solution-dyed fibers. It has been found that flame resistant fabrics constructed of solution-dyed flame resistant fibers retain their color far better than piece-dyed or yarn-dyed fabrics after significant heat exposure, flame exposure, long-term overexposure to UV light, etc., or any other factors which may fade color of piece-dyed or yarn-dyed fabrics. Keeping with the previous examples, a black PBI/para-aramid fabric that is solution dyed has held far more of its black color than the yarn-dyed or piece-dyed PBI/para-aramid fabric examples discussed above and does not turn to the reddish brown color when exposed to high heat. This minimal color change is clearly an advantage over the piece-dyed and yarn-dyed fabrics. However, because of the minimal color change, one of the problems discovered with solution dyed flame resistant fabrics is that they do not indicate when the fabric has been exposed to any significant heat exposure, flame exposure, long-term overexposure to UV light, etc., as with the piece-dyed and yarn-dyed fabrics. As a result, the solution dyed flame resistant fabrics do not indicate when the garment and its components need to be evaluated for further damages.

The instant invention is designed to solve the problem with both piece-dyed/yarn-dyed flame resistant fabrics and solution dyed flame resistant fabrics by providing a way to keep the positive attribute of a fabric made of solution-dyed fibers, (minimal overall color change, i.e., maximum colorfastness) while still providing some sort of indicator to the end-user that the garment had seen a high heat exposure, flame exposure, excessive UV light exposure, or other factors which may fade color of piece-dyed and yarn-dyed fibers.

The instant invention of a flame resistant fabric with tracing yarns is designed to address the above mentioned problems.

SUMMARY OF THE INVENTION

The instant invention is directed toward a flame resistant fabric with tracing yarns. The flame resistant fabric with tracing yarns includes a flame resistant fabric with a first non-tracing yarn, and a second tracing yarn. The first non-tracing yarn and/or the second tracing yarn include flame resistant fibers being selected from the group consisting of inherently flame resistant fibers and treated fibers. When the flame resistant fabric is exposed to heat, flames, long-term excessive UV light, or the like, the first non-tracing yarn is adapted to hold its color and the second tracing yarn is adapted to change colors.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 1A is one embodiment of a flame resistant fabric with tracing yarns inserted at regular intervals in both the warp and the weft directions.

FIG. 1B is the flame resistant fabric with tracing yarns shown in FIG. 1A where the tracing yarns inserted at regular intervals in both the warp and the weft directions have changed colors after being exposed to high heat, flames, long-term excessive UV light, or the like.

FIG. 2B is the flame resistant fabric with tracing yarns shown in FIG. 2A where the tracing yarns inserted at random intervals in the warp direction have changed colors after being exposed to high heat, flames, long-term excessive UV light, or the like.

FIG. 3B is the flame resistant fabric with tracing yarns shown in FIG. 3A where the tracing yarns inserted at random intervals in the weft direction have changed colors after being exposed to high heat, flames, long-term excessive UV light, or the like.

DETAILED DESCRIPTION OF THE INVENTION

Figure 2A:
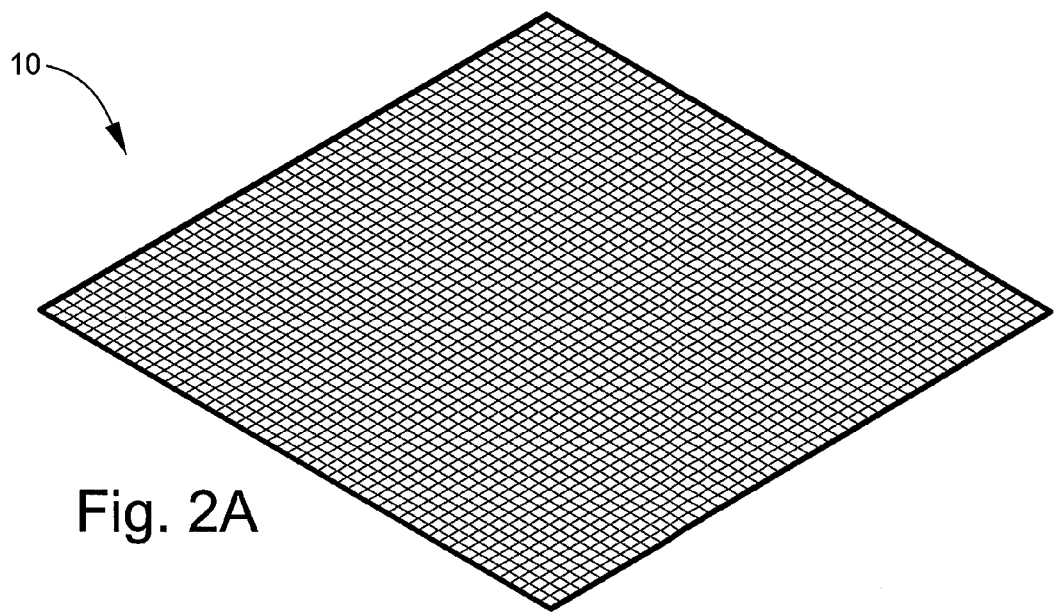
FIG. 2A is one embodiment of a flame resistant fabric with tracing yarns inserted at random intervals in the warp direction of the fabric.

Referring to the drawings, wherein like numerals indicate like elements, there is shown in FIGS. 1-3 an embodiment of a flame resistant fabric 10 with tracing yarns. Flame resistant fabric 10 with tracing yarns may be for providing a flame resistant fabric that has minimal dye sublimation when exposed to high heat and/or flames, or fading due to long-term excessive UV light exposure, or the like. In other words, flame resistant fabric 10 may have good overall color fastness when exposed to high heat, flames, long-term excessive UV light, or the like. However, flame resistant fabric 10 may also provide an indication to the wearer that the fabric has been exposed to high heat, flames, excessive UV light, or the like by the color change of the tracing yarns inserted in the fabric. As a result, the flame resistant fabric 10 with tracing yarns of the instant invention is designed to solve the problem with both piece-dyed/yarn-dyed flame resistant fabrics and solution dyed flame resistant fabrics by providing a way to keep the positive attribute of a fabric made of solution-dyed fibers, (minimal overall color change, i.e., maximum colorfastness) while still providing some sort of indicator to the end-user that the garment had seen a high heat exposure, flame exposure, long-term excessive UV light exposure, or other factors which may fade color of piece-dyed and yarn-dyed fibers.

Flame resistant fabric 10 with tracing yarns may generally include a flame resistant fabric including: a first non-tracing yarn 12 and a second tracing yarn 14. When the flame resistant fabric 10 may be exposed to heat 16 (as depicted in the Figures), flames, long-term excessive UV light, or other factors which may fade color, the first non-tracing yarn 12 may be adapted to hold its overall color, while the second tracing yarn 14 may be adapted to change colors. As a result, the instant invention provides a flame resistant fabric that holds its overall color when exposed to heat, excessive UV light, or other factors which may fade the color of the fibers, while providing a visible indication of heat, excessive UV light, etc. exposure on a portion of the fabric.

First non-tracing yarns 12 may be included in flame resistant fabric 10 with tracing yarns of the instant invention. See FIGS. 1-3. First non-tracing yarns 12 are any yarns that do not significantly change colors or have less color change than piece-dyed or yarn-dyed fibers when exposed to heat, long-term excessive UV light, etc., or other factors which may fade the color of the piece-dyed or yarn-dyed fibers in flame resistant fabrics. For example, first non-tracing yarns 12 may include, but are not limited to, solution-dyed fibers. In one embodiment, the first non-tracing yarn 12 of the instant invention may be made of entirely solution-dyed flame resistant fibers. In other embodiments, first non-tracing yarn 12 may be made of other types of dyed fibers that have good color fastness. The first non-tracing yarn 12 may be present in any amount in the flame resistant fabric. In one embodiment, the first non-tracing yarn 12 may be greater than 50% of the yarns in the flame resistant fabric 10. In another embodiment, the first non-tracing yarn 12 may be greater than 75% of the yarns in the flame resistant fabric 10. In yet another embodiment, the first non-tracing yarns 12 may be greater than 90% of the yarns in the flame resistant fabric 10.

Second tracing yarns 14 may be included in the flame resistant fabric 10 with tracing yarns of the instant invention. See FIGS. 1-3. Second tracing yarns 14 may be any yarns that change color when exposed to heat, excessive UV light, or other factors which may fade the color of flame resistant fabrics. For example, second tracing yarns 14 may include, but are not limited to, yarn-dyed yarns, or piece-dyed yarns. In one embodiment, the second tracing yarn 14 of the instant invention may be a yarn-dyed yarn. The second non-tracing yarn 14 may be present in any amount in the flame resistant fabric. The amount of second tracing yarns 14 present in flame resistant fabric 10 may be based on the desired amount of color change in the fabric or the desired pattern utilized to indicate the exposure to heat, flames, excessive UV light, etc. In one embodiment, the second tracing yarn 14 may be less than 50% of the yarns in flame resistant fabric 10. In another embodiment, the second tracing yarn 14 may be less than 25% of the yarns in the flame resistant fabric 10. In yet another embodiment, the second tracing yarn 14 may be less than 10% of the yarns in the flame resistant fabric 10.

The flame resistant fabric 10 with tracing yarns of the instant invention may be any type of fabric, including, but not limited to, a woven fabric, a non-woven fabric, or a knitted fabric. The second tracing yarns 14 may be randomly inserted in the flame resistant fabric, or they may be inserted at regular intervals in the flame resistant fabric. In some embodiments, the second tracing yarn may be inserted randomly in the warp and/or weft direction of the flame resistant fabric. In other embodiments, the second tracing yarn may be inserted in the warp and/or weft directions of the flame resistant fabric at regular intervals.

Referring to the first Figure, in FIG. 1A an embodiment of a flame resistant fabric with tracing yarns inserted at regular intervals in both the warp and the weft directions is shown. As shown in FIG. 1B, once the fabric is exposed to the heat or flames 16 (could also be long-term excessive UV light exposure of the like), the tracing yarns inserted at regular intervals in both the warp and the weft directions have changed colors after being exposed to the heat of flames 16. This change in color creates a grid or boxed pattern in flame resistant fabric 10, which will indicate to the user that the garment and its components needs to be examined and/or replaced.

Figure 2B:
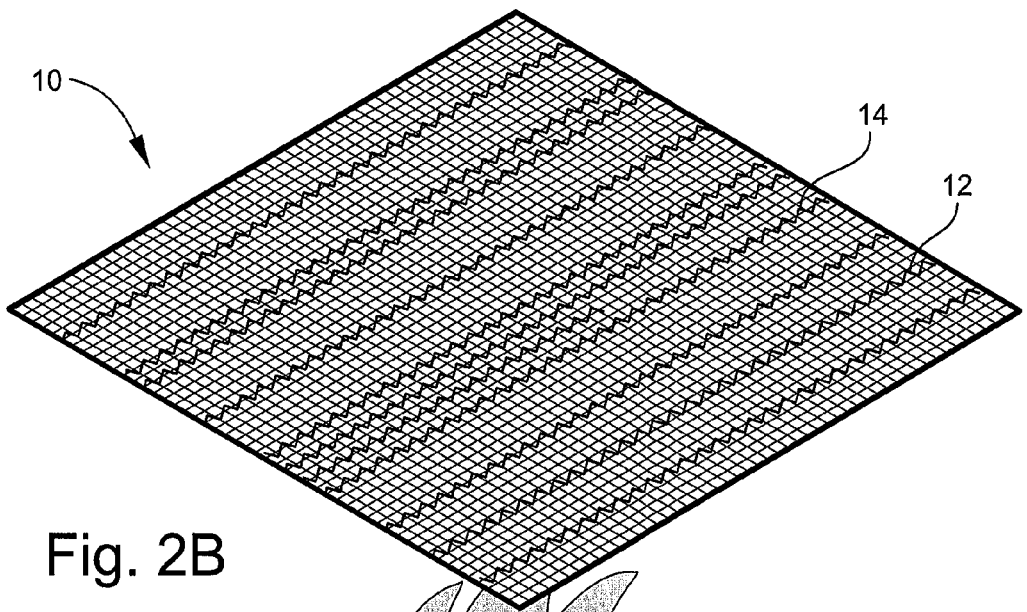

Referring to the second Figure, in FIG. 2A an embodiment of a flame resistant fabric with tracing yarns inserted at random intervals in the warp direction is shown. As shown in FIG. 2B, once the fabric is exposed to heat or flames 16 (could also be long-term excessive UV light exposure or the like), the tracing yarns inserted at random intervals in the warp direction have changed colors after being exposed to the heat of flames 16. This change in color creates a vertical line pattern in flame resistant fabric 10, which will indicate to the user that the garment and its components needs to be examined and/or replaced.

Figure 3A:
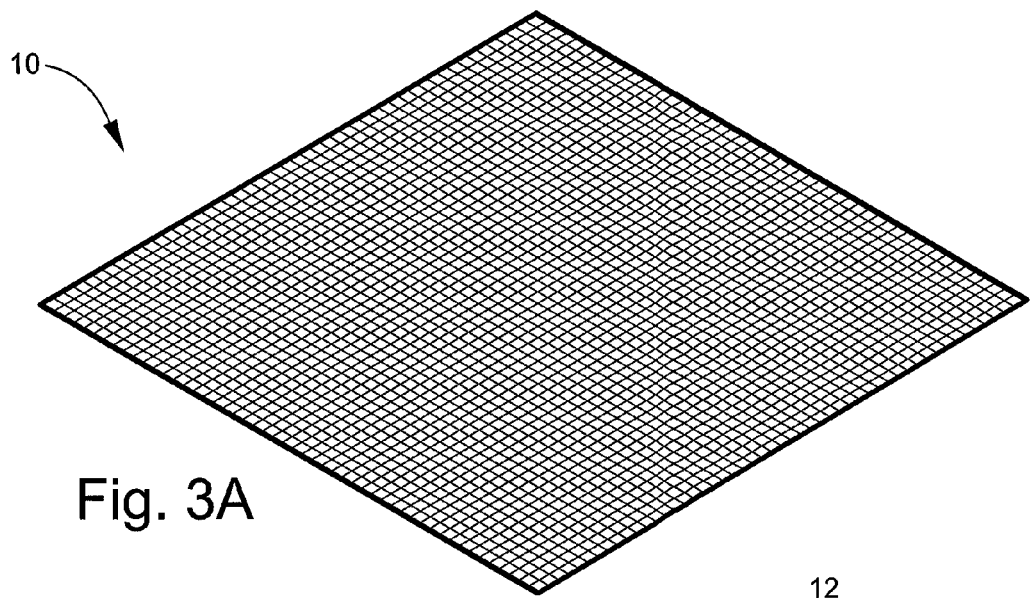
FIG. 3A is one embodiment of a flame resistant fabric with tracing yarns inserted at random intervals in the weft direction of the fabric.
Figure 3B:
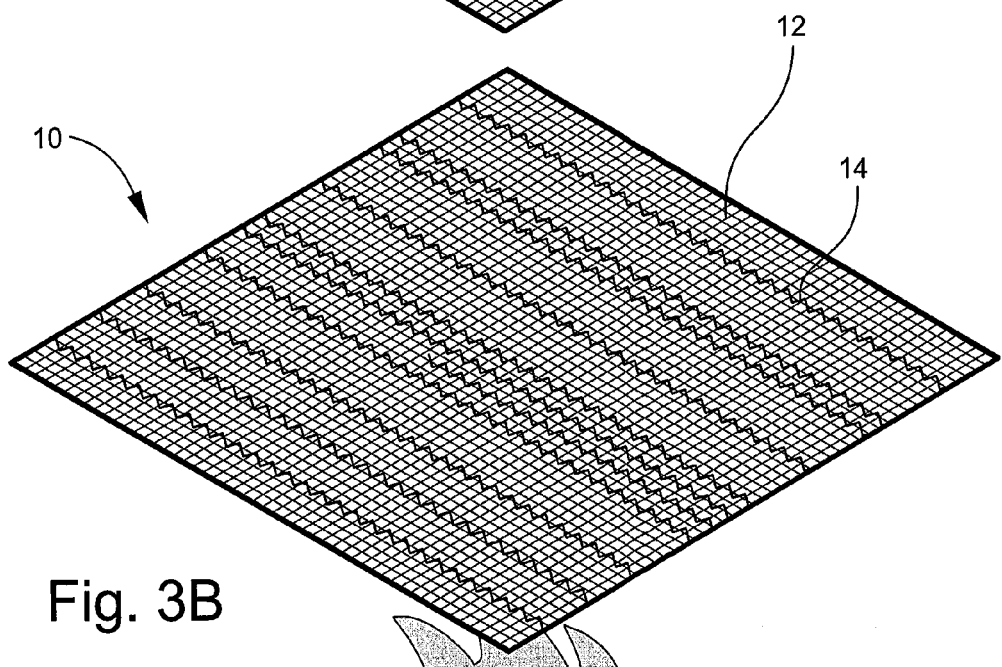

Referring to the third Figure, in FIG. 3A an embodiment of a flame resistant fabric with tracing yarns inserted at random intervals in the weft direction is shown. As shown in FIG. 3B, once the fabric is exposed to heat or flames 16 (could also be long-term excessive UV light exposure or the like), the tracing yarns inserted at random intervals in the weft direction have changed colors after being exposed to the heat of flames 16. This change in color creates a horizontal line pattern in flame resistant fabric 10, which will indicate to the user that the garment and its components needs to be examined and/or replaced.

The first non-tracing yarns 12 and/or the second tracing yarns 14 of the flame resistant fabric 10 with tracing yarns of the instant invention may include flame resistant fibers. The flame resistant fibers may be any flame resistant fibers, including, but not limited to, inherently flame resistant fibers and treated flame resistant fibers. The inherently flame resistant fibers may be, but are not limited to, aramids, polyamide imides, melamines, polybenzimidazole (PBI), polyimides, polyphenylene benzodisoxazole (PBO), polyphenylene sulfide (PPS), Polytetrafluoroethylene (PTFE), polyetherether ketone (PEEK), modacrylic, inherently-FR rayon, liquid crystal polymers, the like, and combinations thereof. The treated flame resistant fibers may be, but are not limited to, FR cotton, FR-treated rayon, the like, and combinations thereof. In one embodiment, the flame resistant fibers may be PBI.

The first non-tracing yarns 12 and/or the second tracing yarns 14 of the flame resistant fabric 10 with tracing yarns of the instant invention may further comprise non-FR fibers. The non-FR fibers may be any non-FR fibers, including, but not limited to, cotton, rayon, polyester, or the like. The non-FR fibers may be included within the first yarn 12 and/or the second yarn 14, or the non-FR fibers may be spun into a third yarn that is included in the flame resistant fabric 10.

The instant invention also includes a method of manufacturing flame resistant fabric 10 with tracing yarns. This method may include any steps for creating flame resistant fabric 10 with tracing yarns. In one embodiment, this method may include, but is not limited to, the following steps: a step of providing a plurality of first non-tracing yarns 12; a step of providing a plurality of second tracing yarns 14; and a step of creating a flame resistant fabric 10 including the first non-tracing yarns 12 and the second tracing yarns 14. Whereby, when the flame resistant fabric 10 created by this method is exposed to heat, flames, excessive UV light, or the like, the first non-tracing yarns 12 may be adapted to hold their color and the second tracing yarns 14 may be adapted to change colors. In one embodiment, the step of creating a flame resistant fabric may include a step of inserting the second tracing yarn randomly or at regular intervals in the warp direction and/or weft direction of flame resistant fabric 10. This method of manufacturing flame resistant fabric 10 may also include any other steps for creating flame resistant fabric 10 with tracing yarns, as described above.

EXAMPLES

An example flame resistant fabric with tracing yarns was created according to the instant invention. The fabric was a black woven fabric that included tracing yarns and non-tracing yarns. The Tracing yarns were a blend of 60% p-aramid and 40% PBI. The yarns were constructed of natural PBI and p-aramid, and were subsequently package dyed to produce the black yarn. The non-tracing yarns were also a blend of 60% p-aramid and 40% PBI. The non-tracing yarns were constructed using solution-dyed Black PBI and solution-dyed Black p-aramid. The tracing yarns were inserted in the weft direction at regular intervals and made up between 4-5% by weight of the resulting fabric.

A swatch of the example flame resistant fabric with tracing yarns was first tested with a 10-second Thermal Protection Performance (TPP) exposure. The TPP exposure was 2 cal/cm2-s heat flux (about 1800 F), combination flame and radiant heat. This TPP exposure caused the tracing yarns to change colors while the non-tracing yarns had very good colorfastness. The results of the TPP exposure created reddish brown stripes that clearly showed up in the black fabric.

A second swatch of the example flame resistant fabric with tracing yarns was then tested with a 10-second Radiant Protective Performance (RPP) exposure. The RPP exposure was 1 cal/cm2-s heat flux, radiant heat only. Similar to the TPP exposure, the RPP exposure caused the tracing yarns to change colors while the non-tracing yarns had very good colorfastness. The results of the RPP test created reddish brown stripes that clearly showed up in the black flame resistant fabric.

A third swatch of the example flame resistant fabric with tracing yarns was then tested to ensure that both the non-tracing and tracing yarns had good color fastness after being washed. The fabric was washed 5 times as required by NFPA 1971, *Standard on Protective Ensembles for Structural Fire Fighting and Proximity Fire Fighting* (2007 *Edition*). The results of these tests showed that there was no indication of color change/stripes after laundry, i.e. both the tracing yarns and non-tracing yarns maintained their black color.

The present invention may be embodied in other forms without departing from the spirit and the essential attributes thereof, and, accordingly, reference should be made to the appended claims, rather than to the foregoing specification, as indicated in the scope of the invention.

We claim:

1. A method for indicating exposure of a flame resistant fabric of a protective garment to heat, flame, or UV light comprising the step of:
   exposing the flame resistant fabric including a tracing yarn to heat, flame, or UV light, the tracing yarn includes flame resistant fibers, the flame resistant fibers include inherently flame resistant fibers and/or treated flame resistant fibers, the inherently flame resistant fibers include polyamide imide, melamine, polybenzimidazole, polyimide, polyphenylene benzodisoxazole, polyphenylene sulfide, polytetrafluoroethylene, polyetherether ketone, modacrylic, inherently-FR rayon, liquid crystal polymers, and combinations thereof, the treated flame resistant fibers include FR cotton, FR-treated rayon, and combinations thereof; and indicating the exposure by the tracing yarn changing from a first color to a second color, wherein the exposure being equal to or greater than 1 cal/cm2-s.

2. The method of claim 1 wherein the heat resistant fabric comprises the tracing yarn and a non-tracing yarn.

3. The method of claim 2 wherein the non-tracing yarn is a solution dyed yarn.

4. The method of claim 2 wherein the non-tracing yarn includes flame resistant fibers.

5. The method of claim 4 wherein the flame resistant fibers include inherently flame resistant fibers and treated flame resistant fibers.

6. The method of claim 5 wherein the inherently flame resistant fibers include aramid, polyamide imide, melamine, polybenzimidazole, polyimide, polyphenylene benzodisoxazole, polyphenylene sulfide, polytetrafluoroethylene, polyetherether ketone, modacrylic, inherently-FR rayon, liquid crystal polymers, and combinations thereof.

7. The method of claim 5 wherein the treated flame resistant fibers include FR cotton, FR-treated rayon, and combinations thereof.

8. The method of claim 4 wherein the flame resistant fibers include non-FR fibers.

9. The method of claim 1 wherein the tracing yarn is a package dyed yarn.

10. The method of claim 1 wherein the tracing yarn is less than 50% of the heat resistant fabric.

11. The method of claim 1 wherein the inherently flame resistant fibers further include aramid.

12. The method of claim 1 wherein the flame resistant fibers include non-FR fibers.

13. A method for indicating exposure of a flame resistant fabric of a protective garment to heat, flame, or UV light comprising the step of:

exposing the flame resistant fabric to heat, flame, or UV light, the flame resistant fabric comprises a tracing yarn and a non-tracing yarn, and the tracing yarn is less than 50% of the flame resistant fabric, and indicating the exposure by the tracing yarn changing from a first color to a second color when the exposure is equal to or greater than 1 cal/cm2-s.

14. The method of claim 13, wherein the non-tracing yarn includes inherently flame resistant fibers and/or treated flame resistant fibers.

15. The method of claim 14 wherein the inherently flame resistant fibers include aramid, polyamide imide, melamine, polybenzimidazole, polyimide, polyphenylene benzodisoxazole, polyphenylene sulfide, polytetrafluoroethylene, polyetherether ketone, modacrylic, inherently-FR rayon, liquid crystal polymers, and combinations thereof.

16. The method of claim 14 wherein the treated flame resistant fibers include FR cotton, FR-treated rayon, and combinations thereof.

* * * * *